US012570365B2

(12) United States Patent
Jeong et al.

(10) Patent No.: US 12,570,365 B2
(45) Date of Patent: Mar. 10, 2026

(54) ACTIVE AIR FLAP APPARATUS FOR A VEHICLE

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Phil Jung Jeong, Seongnam-si (KR); Su Ji Kim, Hwaseong-si (KR); Hyeon Seok Yoon, Hwaseong-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 441 days.

(21) Appl. No.: 18/119,652

(22) Filed: Mar. 9, 2023

(65) Prior Publication Data

US 2024/0051620 A1     Feb. 15, 2024

(30) Foreign Application Priority Data

Aug. 11, 2022     (KR) ........................ 10-2022-0100753

(51) Int. Cl.
*B62D 35/00*          (2006.01)
*B60K 11/08*          (2006.01)

(52) U.S. Cl.
CPC .......... *B62D 35/005* (2013.01); *B60K 11/085* (2013.01)

(58) Field of Classification Search
CPC ...... B62D 35/005; B62D 35/02; B62D 35/00; B62D 11/085; B62D 37/02; B60K 11/085; B60K 11/04; B60Y 2306/05; Y02T 10/88

USPC ....................................... 296/180.5; 180/68.1
See application file for complete search history.

(56) References Cited

U.S. PATENT DOCUMENTS

| | | | | |
|---|---|---|---|---|
| 8,118,124 | B2 * | 2/2012 | Shin .......................... | F01P 7/12 |
| | | | | 454/75 |
| 9,110,896 | B2 * | 8/2015 | Jeong ................. | G05B 23/0275 |
| 9,914,351 | B2 * | 3/2018 | Kim ..................... | B60K 11/085 |
| 10,166,858 | B2 * | 1/2019 | Ibañez Moreira ...... | F16H 37/12 |
| 10,953,740 | B2 * | 3/2021 | Solazzo ................. | G01R 33/07 |
| 2012/0043146 | A1 * | 2/2012 | Schneider ............ | B60K 11/085 |
| | | | | 180/68.1 |
| 2014/0346809 | A1 * | 11/2014 | Lee ...................... | B60K 11/085 |
| | | | | 296/180.5 |
| 2017/0072783 | A1 * | 3/2017 | Jeong ..................... | B60K 11/04 |
| 2021/0114670 | A1 * | 4/2021 | Kim .......................... | F01P 7/10 |
| 2021/0300174 | A1 * | 9/2021 | Sui ........................ | B60K 11/085 |
| 2022/0080823 | A1 * | 3/2022 | Kim ..................... | B60K 11/085 |

FOREIGN PATENT DOCUMENTS

| | | |
|---|---|---|
| KR | 20140032620 A | 3/2014 |
| KR | 20230029142 A | 3/2023 |

* cited by examiner

*Primary Examiner* — Hau V Phan
(74) *Attorney, Agent, or Firm* — Lempia Summerfield Katz LLC

(57) ABSTRACT

An active air flap apparatus for a vehicle, wherein when an air flap is in a closed state, the air flap may be able to secure strength or robustness with support provided by an actuator and a stopper. The active air flap apparatus may prevent noise and improve aerodynamic performance by preventing undesired movement and vibration of the air flap even when an external force and driving wind act on the air flap in a closed state of the air flap.

18 Claims, 10 Drawing Sheets

ACTIVE AIR FLAP APPARATUS FOR A VEHICLE

CROSS REFERENCE TO RELATED APPLICATION

The present application claims priority to Korean Patent Application No. 10-2022-0100753, filed on Aug. 11, 2022, the entire contents of which are incorporated herein for all purposes by this reference.

BACKGROUND OF THE DISCLOSURE

Technical Field

The present disclosure relates to an active air flap apparatus for a vehicle and, more particularly, to an active air flap for a vehicle capable of improving aerodynamic performance by preventing undesired movement and vibration of an air flap due to external force and driving wind or air flow when the air flap is closed.

Description of the Related Art

In an engine compartment of a vehicle, various heat exchangers such as a radiator, an intercooler, an evaporator, and a condenser are provided in addition to an engine and a transmission for driving the vehicle.

In such heat exchangers, a heat exchange medium mainly circulates therein. The heat exchange medium inside the heat exchanger and air outside of the heat exchanger exchange heat with each other, thereby cooling components or dissipating heat. In order to reliably or consistently operate various heat exchangers in the engine compartment of a vehicle, external air must be continuously supplied into the engine compartment.

To this end, an active air flap apparatus has been developed that may help improve vehicle fuel efficiency. An air flap opens when the vehicle is driving at low speed to increase an amount of air inflow into the engine compartment to prevent overheating inside the engine compartment. Further, the active air flap apparatus may improve vehicle fuel efficiency by closing the air flap when the vehicle is driving at high speed to reduce air resistance.

However, a conventional active air flap apparatus has a cantilever structure. A first end of the air flap is coupled to an actuator and a second end of the air flap is not coupled to the actuator, so the air flap lacks strength or robustness. For this reason, when an external force or a driving wind is applied to the air flap while the air flap is closed, undesired movement and vibration of the air flap may occur, thereby generating noise and deteriorating aerodynamic performance.

In addition, the air flap may maintain an open state at a specific angle rather than a fully open state or closed state in order to improve fuel efficiency of the vehicle and energy efficiency of the electronic vehicle. It is not possible to secure the air flap in the open state at a specific angle using the conventional active air flap. Thus, undesired movement and vibration of the air flap occur. Thus, there is a disadvantage in that the desired improvement of fuel efficiency of the vehicle and energy efficiency of the electric vehicle are insufficient.

The foregoing is intended merely to enhance understanding of the background of the present disclosure. Therefore, the foregoing is not intended to mean that the present disclosure falls within the purview of the related art that is already known to those of ordinary skill in the art.

SUMMARY OF THE DISCLOSURE

Accordingly, the present disclosure has been made keeping in mind the above problems occurring in the related art. The present disclosure describes an active air flap apparatus intended to secure or obtain a robustness or sturdiness of an air flap by reinforcing a supporting force applied to the air flap when the air flap is closed. Undesired movement and vibration of the air flap may thereby be prevented even when an external force and a driving wind are applied to the air flap while the air flap is closed. Thus, noise may be prevented and aerodynamic performance of a vehicle may be improved.

In addition, objectives of the present disclosure are to improve fuel efficiency of a vehicle and energy efficiency of an electric vehicle by securing the position of the air flap when the air flap is opened to a specific angle.

In order to achieve the above objectives, the active air flap apparatus of a vehicle of the present disclosure includes: an air flap rotatably coupled to a duct housing and configured to open and close the duct housing; an actuator secured to the duct housing and configured to generate power for rotating the air flap during operation; and a stopper rotatably coupled to the duct housing and configured to come into contact with the air flap when the air flap is in a closed state thereby supporting the air flap.

In a closed state of the air flap, a first end of the air flap may be supported by a connection with the actuator and a second end of the air flap may be supported by contact with the stopper.

In an open state of the air flap, the stopper may be separated from the air flap, and the air flap may not be supported, i.e., may be released, by the stopper.

The active air flap apparatus may further include: a rotary link coupled to the actuator to rotate when the actuator is operated; a first power transmission link connecting the rotary link to the first end of the air flap and transmitting the power for rotating the air flap; and a second power transmission link connecting the rotary link to the stopper and transmitting power for an operation of the stopper.

The air flap may be rotatably coupled to the duct housing and may include a base flap connected to the first power transmission link and may include an upper flap and a lower flap that are coupled to a front of the base flap to be separated vertically from each other.

The stopper may have a body portion having an upper end rotatably coupled to the duct housing and having a slot hole extending downward and may have a contact portion protruding from the body portion and configured to come into contact with and support the air flap when the air flap is closed.

Each of the first power transmission link and the second power transmission link may include at least two links connected to each other. A first total length of the links that is formed by aligning connection points of the links in a straight line from a center point of the rotary link to an end of the first power transmission link may be shorter than a second total length of the links that is formed by aligning connection points of the links in a straight line from the center of the rotary link to an end of the second power transmission link.

A length ratio of the first total length and the second total length may be adjusted to make a difference between operating speeds of the air flap and the stopper. Thus, interference with the air flap by the stopper when the air flap is operating to be opened from the closed state may be prevented.

When the air flap is operating to be opened from the closed state, the stopper and the air flap may be sequentially operated so that interference with the air flap by the stopper may be prevented.

When the air flap is operating to be opened from the closed state, the stopper may rotate counterclockwise to operate before the air flap. Thereafter, the air flap may rotate clockwise and operate so that interference with the air flap by the stopper may be prevented.

When the stopper operates first to secure an opening operation space for the air flap, the opening operation of the air flap may be sequentially performed after the stopper operates.

In the active air flap apparatus, a link protrusion of a third link constituting the second power transmission link may be connected to a guide groove of the rotary link and may be configured to move along the guide groove during a rotation of the rotary link. The guide groove may be divided into a stopper operation section and a stopper non-operation section. The stopper may be operated when the link protrusion moves in the stopper operation section. The stopper may be maintained in an operation end state, i.e., not operated, when the link protrusion moves in the non-operation section.

The stopper operation section may be defined along a straight-line or curved-line profile diverging from a rotation radius of the rotary link at a first end of the guide groove. The stopper non-operation section may be connected to the stopper operation section and may be defined in a curved-line profile along the rotation radius of the rotary link by being extended to a second end of the guide groove. A length of the stopper non-operation section may be configured to be longer than a length of the stopper operation section.

When the air flap is in the closed state and the stopper is in contact with the air flap, the link protrusion may be located at an end of the stopper operation section. When the link protrusion moves along the stopper operation section to an interface position between the stopper operation section and the stopper non-operation section due to the rotation of the rotary link, the stopper may rotate and a contact of the stopper with the air flap may be released. When the link protrusion diverges from the stopper operation section, the stopper operation may be ended. When the link protrusion moves along the stopper non-operation section, the stopper may be maintained in the operation end state.

When the link protrusion moves along the stopper operation section, only the stopper may operate, and the air flap may not operate and remain in the closed state.

When the link protrusion moves along the stopper non-operation section, the stopper may be maintained in the operation end state and the air flap may operate to be opened.

A closing hole may be provided at an end of the stopper operation section. The closing hole may be configured such that when the air flap is closed, the link protrusion is inserted into the closing hole. A full-open hole may be provided at an end of the stopper non-operation section. The full-open hole may be configured such that, when the air flap is fully opened, the link protrusion is inserted in to the full-open hole. A plurality of middle-open holes may be provided at the stopper non-operation section to be spaced apart from each other. The middle-open holes may be configured such that, when the air flap is opened to a specific angle, the link protrusion is inserted into one of the middle-open holes.

When the air flap is closed and is in contact with the stopper, a link pin of a fifth link constituting the second power transmission link may be located at a lowermost end of a slot hole formed in the stopper. When an external force is applied to the stopper where the link pin is located at the lowermost end of the slot hole, a torque may act in a normal direction of the link pin. The torque may act with a normal force to a hinge point of the fifth link, so that no influence of the external force may be affected on movements of the fifth link and so that the fifth link may act as a rigid body supporting the stopper.

In the active air flap apparatus, a link connected to the air flap may be connected to a fixed point of the rotary link, and a link connected to the stopper may be connected to a trajectory of the rotary link divided into the stopper operation section and the stopper non-operation section.

In the active air flap apparatus of a vehicle, according to an embodiment of the present disclosure, when the air flap closes a flow path of the duct housing, the first end of the air flap is supported by connection with the actuator and the second end of the air flap is supported by contact with the stopper. The strength or robustness of the air flap can be secured by reinforcing the supporting force applied or available to the air flap. Through this, it is possible to prevent undesired movement and vibration of the air flap when external force and driving wind are applied to the air flap while the air flap is closed. As a result, it is possible to prevent noise and to improve aerodynamic performance.

In addition, according to the present disclosure, when the air flap is operating to be opened from the closed state, the stopper operates first to secure the operation space for the air flap. After the stopper operation starts, the air flap operates sequentially, and the operation of the air flap and the operation of the stopper are configured to operate in opposite directions to each other. Thus, the interference with the air flap by the stopper is prevented during the opening operation of the air flap thereby ensuring reliable or consistent operability.

Further, the present disclosure is configured to secure a position of the air flap through the link protrusion and the hole in which the link protrusion is inserted when the air flap is opened to a specific angle. The fuel efficiency of a vehicle and energy efficiency of an electric vehicle may thereby be improved. The effects that can be obtained from the present inventive concept are not limited to those described in the aforementioned description. Other objectives not explicitly disclosed herein should be clearly understood by a person having ordinary skill in the art in view of the description provided hereinafter.

DETAILED DESCRIPTION

Figure 1:
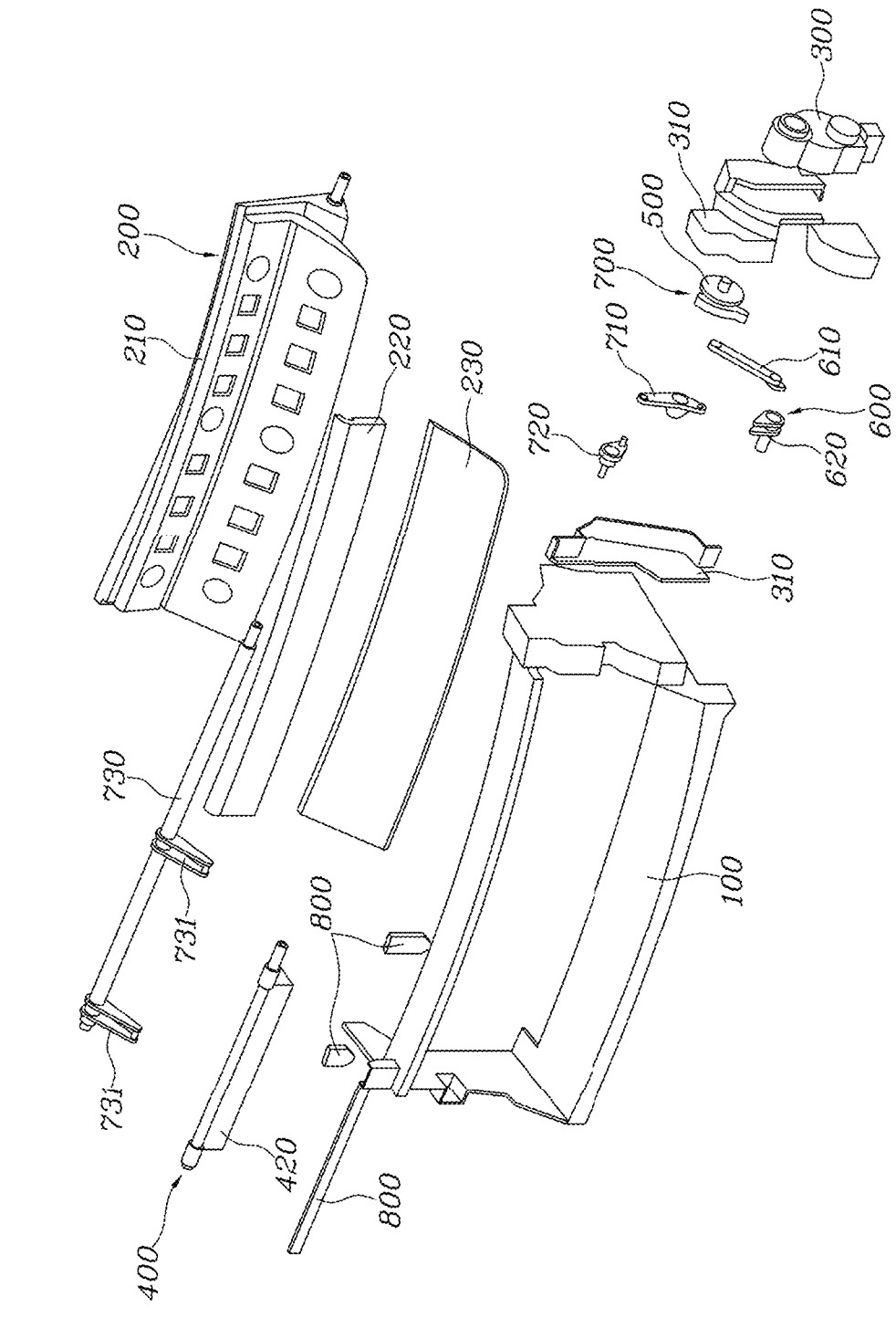
FIG. 1 is an exploded view of an active air flap apparatus of a vehicle according to the present disclosure.
Figure 2:
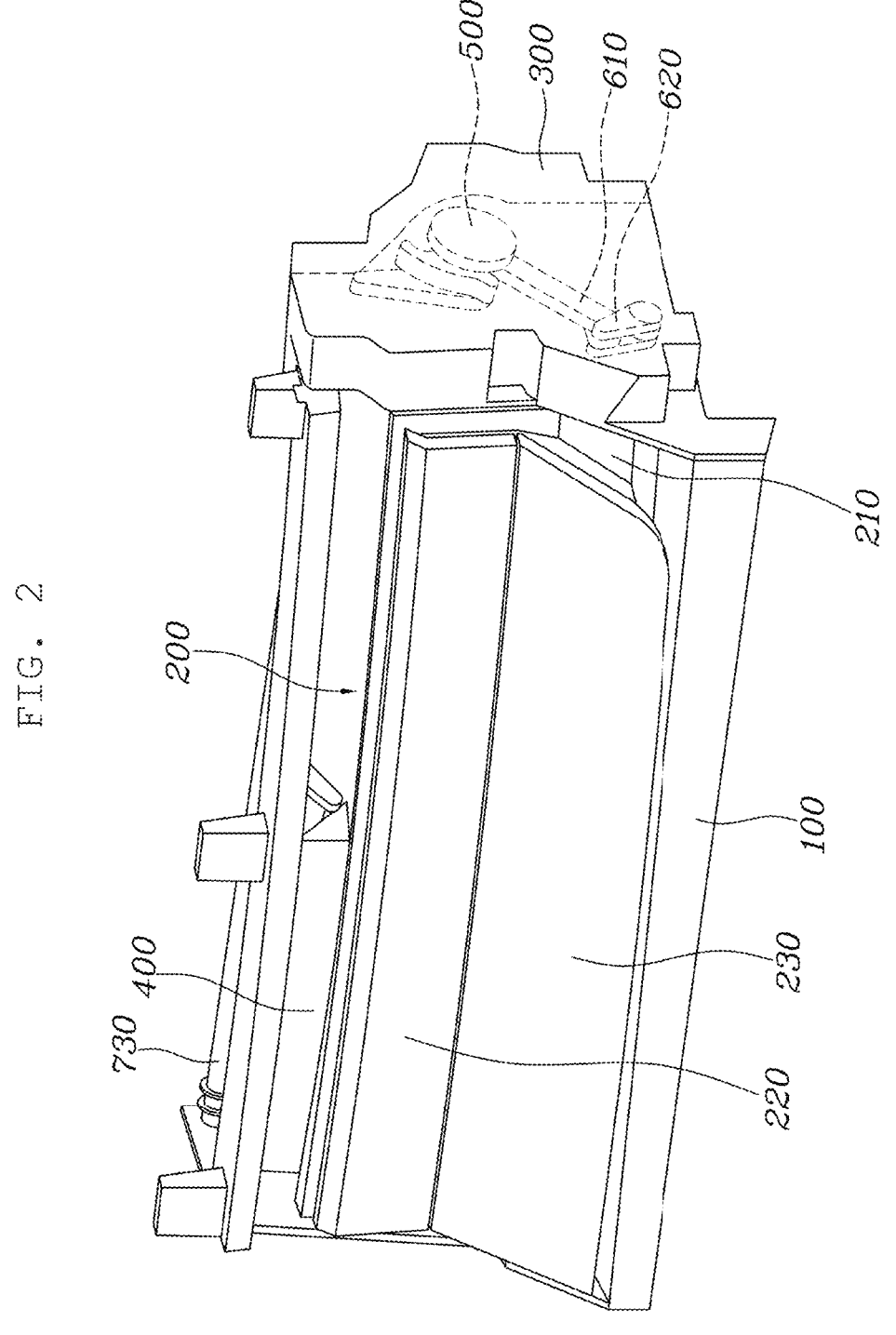
FIG. 2 is an assembled view of the active air flap apparatus of FIG. 1.
Figure 3:
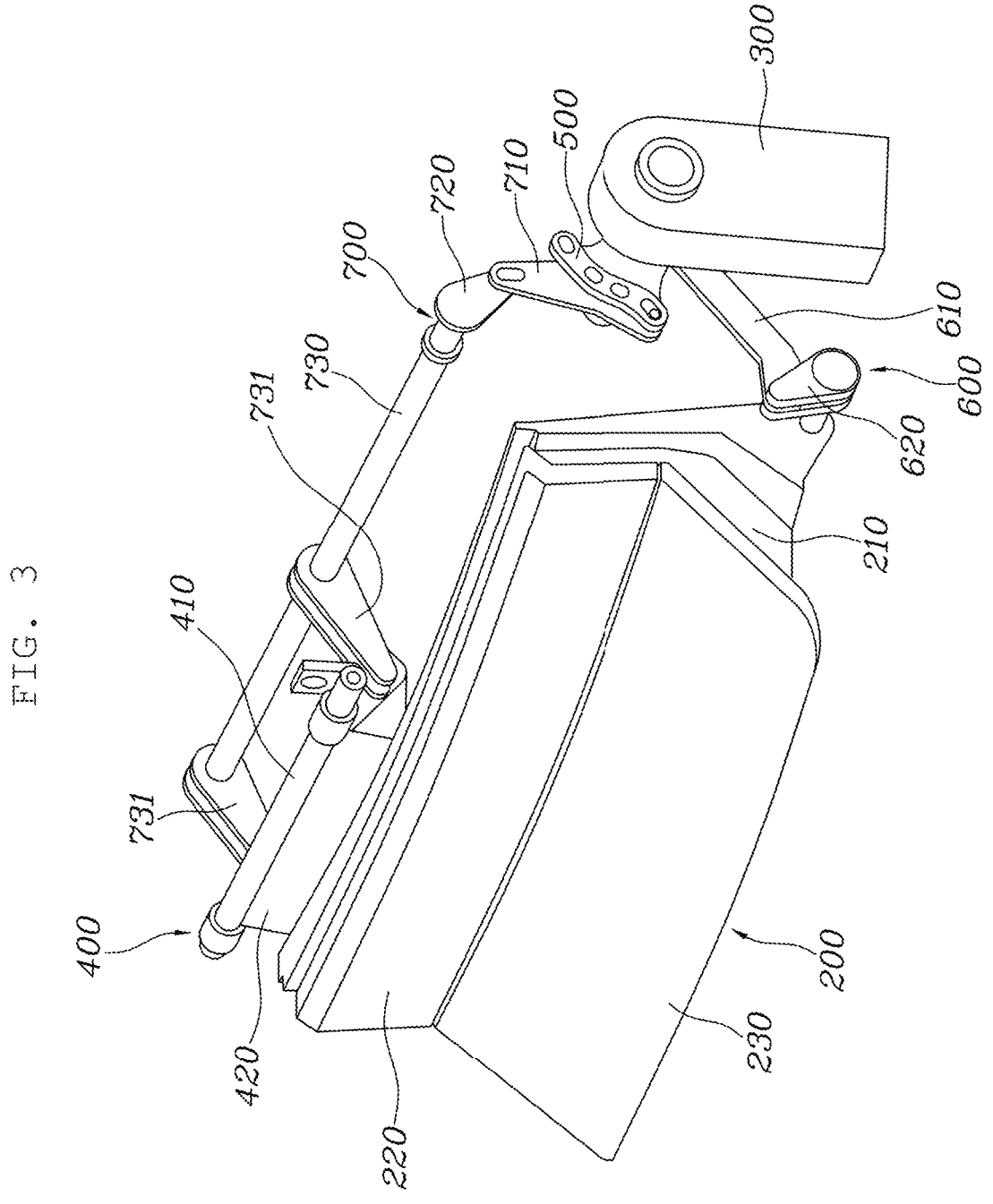
FIGS. 3 and 4 are views of the active air flap apparatus in which a duct housing is removed from FIG. 2.
Figure 4:
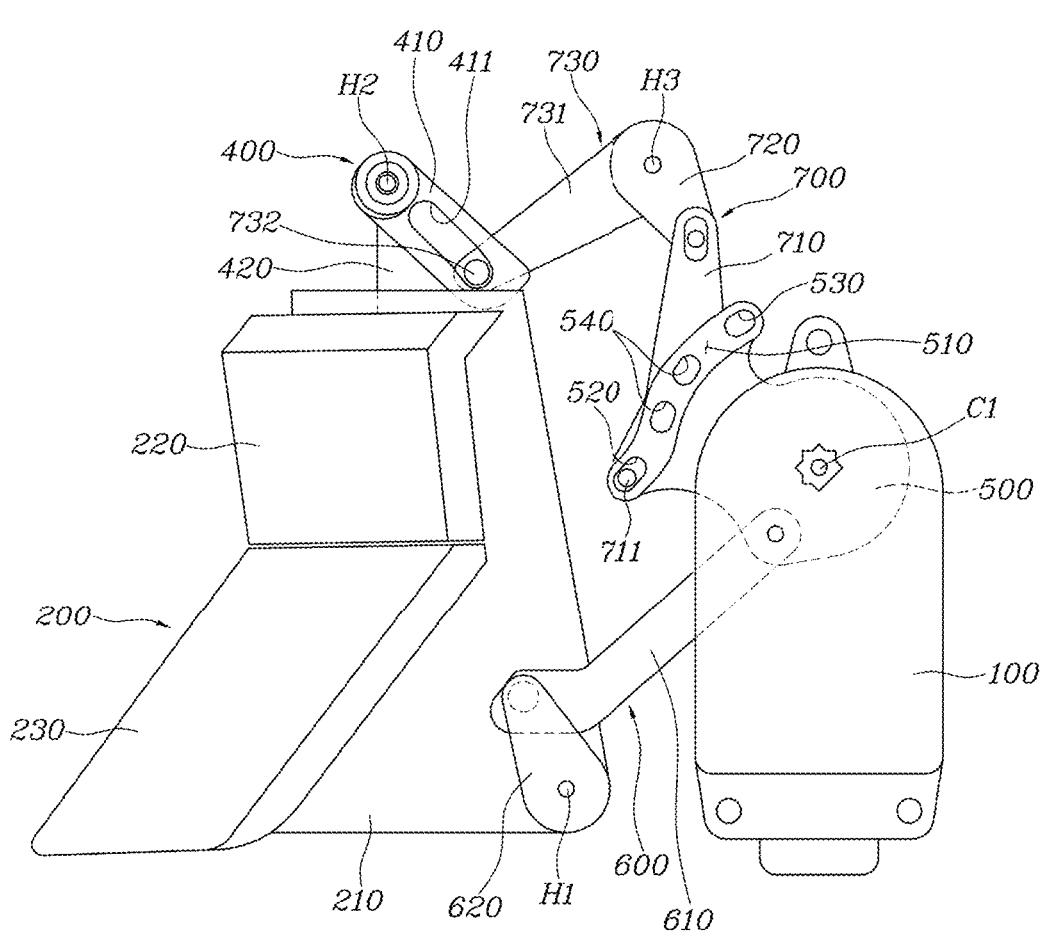

Hereinafter, embodiments of the present disclosure are described in detail. Identical or similar constituent elements are given the same reference numerals among the drawings, and repeated descriptions thereof have been omitted.

The component suffixes "module" and "part" used in the following description are used only considering the ease of creating the specification and have no meanings or roles that are distinguished from each other by themselves.

Further, in the description of the present inventive concept, where it has been determined that a detailed description of the related art would obscure the gist of the present disclosure, a detailed description thereof has been omitted.

Further, the attached drawings are merely intended to be able to readily convey understanding of the embodiments disclosed herein, and thus the technical idea disclosed herein is not limited by the attached drawings. The technical idea disclosed herein should be understood to include all changes, equivalents, and substitutions included in the idea and technical scope of the present disclosure.

It should be understood that, although the terms including ordinal numbers such as "first", "second", etc. may be used herein to describe various elements, these elements should not be limited by these terms. These terms are only used to distinguish one element from another element.

It should be understood that when an element is referred to as being "coupled" or "connected" to another element, it can be directly coupled or connected to the other element or intervening elements may be present therebetween.

In contrast, it should be understood that when an element is referred to as being "directly coupled" or "directly connected" to another element, there are no intervening elements present.

As used herein, the singular forms "a", "an", and "the" are intended to include the plural forms as well, unless the context clearly indicates otherwise.

It should be further understood that the terms "comprise", "include", "have", etc. when used in this specification specify the presence of stated features, integers, steps, operations, elements, components, and/or combinations thereof. Such terms do not preclude the presence or addition of one or more other features, integers, steps, operations, elements, components, and/or combinations thereof.

Further, a unit included in the name such as a motor control unit (MCU), a hybrid control unit (HCU), or the like or a control unit is merely a term widely used for the names of controllers for controlling specified functions for vehicles and does not refer to a generic function unit.

For example, each controller may include a communication device that communicates with other controller or sensors for control of functions in charge, a memory that stores an operating system or logic commands, input/output information, etc., and one or more processors that conduct determination, operation, decision, etc. required to control the functions in charge. When a component, device, element, or the like of the present disclosure is described a having a purpose or performing an operation, function, or the like, the component, device, or element should be considered herein as being "configured to" meet that purpose of perform that operation or function.

Hereinbelow, an active air flap apparatus of a vehicle according to an embodiment of the present disclosure is described with reference to the accompanying drawings.

The active air flap apparatus of a vehicle according to an embodiment of the present disclosure includes: a duct housing 100 forming a flow path for an air flow; an air flap 200 rotatably coupled to the duct housing 100, and opening and closing the duct housing 100; an actuator 300 secured to the duct housing 100 and generating power for a rotation of the air flap 200; and a stopper 400 rotatably coupled to the duct housing 100 and configured to come into contact with the air flap 200 when the air flap 200 is in a closed state, thereby supporting the air flap 200.

The duct housing 100 may be fixedly installed to the front-end module at the rear of the radiator grill provided in front of the vehicle.

The duct housing 100 provides a flow path, and the air flap 200 is rotatably coupled to the duct housing 100 so that the flow path of the duct housing 100 is opened and closed as the air flap 200 rotates.

According to an embodiment of the present disclosure, an airtight state of the flow path of the duct housing 100 may be expressed as a closed state, or a closing state, or a close state of the air flap 200 or any one word having the same meaning as these. An open state of the flow path of the duct housing 100 may be expressed as an opened state, or an opening state, or an open state of the air flap 200 or any one word having the same meaning as these.

The actuator 300 is fixedly coupled to one side of the duct housing 100. The actuator 300 may be configured as a bidirectional motor capable of rotating in both clockwise and counterclockwise directions.

An actuator cover 310 is configured to wrap around and protect the actuator 300. The actuator cover 310 may be fixedly coupled to one side of the duct housing 100 while wrapping around the actuator 300.

In addition, the actuator cover 310 is configured to wrap a first power transmission link 600 and a second power transmission link 700, which is described below, and may protect a link mechanism.

There is an advantage in terms of layout, in that the actuator 300 is coupled to one side of the duct housing 100. Thus, there is no need to secure an additional or separate installation space for the actuator 300.

According to an embodiment of the present disclosure, when the air flap 200 is in a state that closes the flow path of the duct housing 100, a first end of the air flap 200 is configured to be supported by the connection with the actuator 300 and a second end of the air flap 200 is configured to be supported by a contact with the stopper 400 (referring to FIGS. 2-5).

Therefore, it may be possible to secure the strength or robustness of the air flap 200 through the reinforcement of the air flap 200 by a supporting force in the closed state of the air flap 200. Through this, when an external force and a driving wind, i.e., air pressure caused by the vehicle moving, are applied in the closed state of the air flap 200, it may be possible to prevent undesired movement and vibration of the air flap 200. As a result, it may be possible to prevent noise and improve aerodynamic performance.

Figure 10:
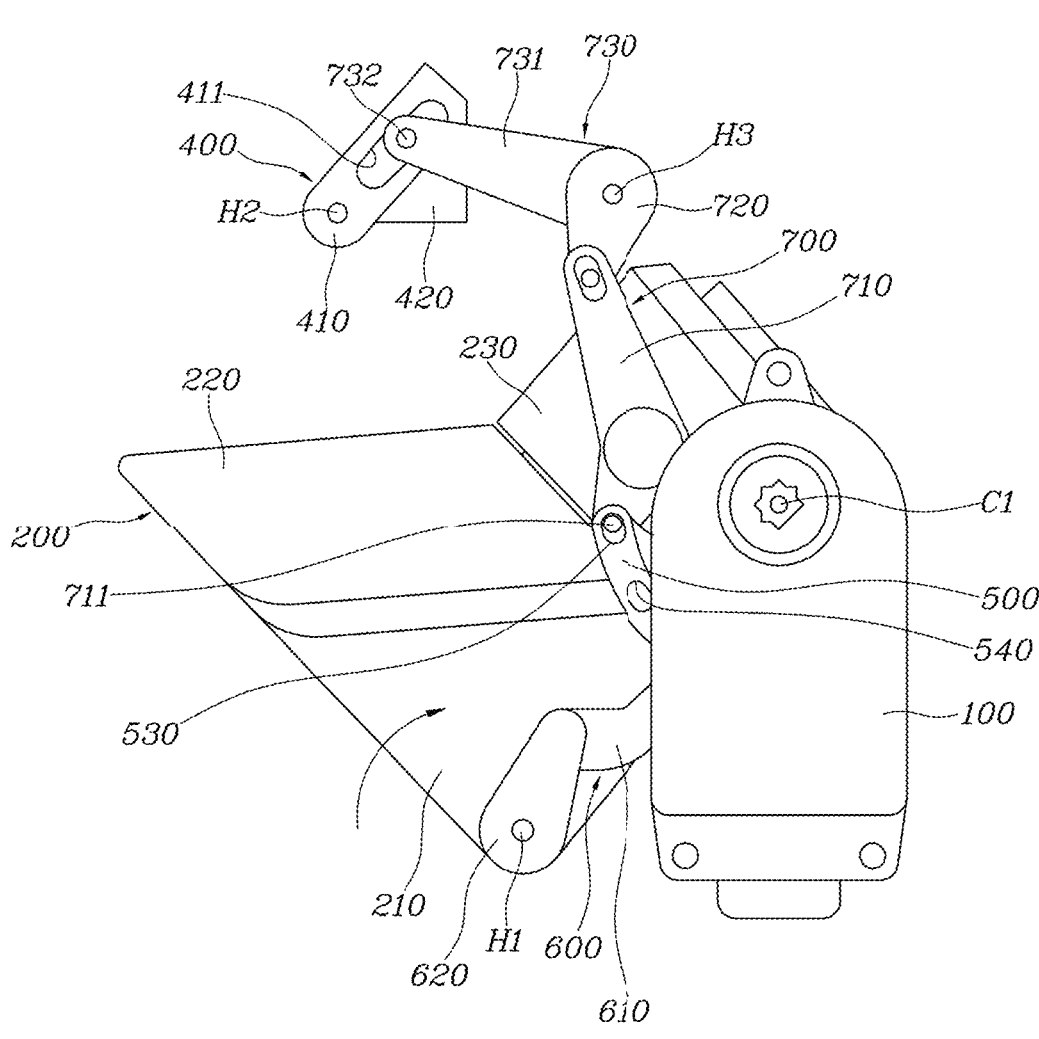
FIG. 10 is a view of an air flap in a fully opened state.

According to an embodiment of the present disclosure, when the air flap 200 is in the opened state, the stopper 400 is separated from the air flap 200, so that the support for the air flap 200 by the stopper 400 is released (referring to FIG. 10).

In other words, in the closed state of the air flap 200, as the strength or robustness of the air flap 200 is achieved or secured by the stopper 400 supporting the air flap 200 and by the supporting force of the actuator 300, it may be possible to prevent undesired movement and vibration of the air flap 200. Further, in the opened state of the air flap 200, as the stopper 400 operates first and the stopper 400 is separated from the air flap 200, the support for the air flap 200 by the stopper 400 is released and an operation space for the air flap 200 that is operated after the stopper 400 is secured or cleared. It may be possible, by the air flap 200 operating sequentially after the operation of the stopper 400 starts, to prevent an interference by the stopper 400 during the opening operation of the air flap 200.

The air flap 200 is rotatably coupled to the duct housing 100 and consists of an assembly of a base flap 210 being a body of the air flap 200 and an upper flap 220 and a lower flap 230 coupled to a front of the base flap and vertically separated from each other.

The upper flap 220 and the lower flap 230 are coupled to the base flap 210 in a separable structure, so there is an advantage in that the components may individually be replaced and/or repaired.

The stopper 400 includes an upper end rotatably coupled to the duct housing 100, a body portion 410 having a slot hole 411 extending downward, and a contact portion 420 protruding from the body portion 410. The contact portion 420 is configured to come into contact with and support the air flap 200 when the air flap 200 is closed.

When the stopper 400 is viewed from the side, the body portion 410 is configured obliquely so that an upper end is rotatably coupled to the duct housing 100 and the slot hole 411 extends in the diagonal direction. The contact portion 420 also protrudes from the body portion 410 toward a top end of the air flap 200 and is configured to have a triangular longitudinal section shape.

The active air flap apparatus according to the present disclosure includes a rotary link 500 coupled to the actuator 300 and configured to rotate when the actuator 300 operates. The active air flap also includes a first power transmission link 600 transmitting power for the rotation of the air flap 200 by connecting the rotary link 500 to a first end of the air flap 200. The active air flap further includes a second power transmission link 700 transmitting power for the operation of the stopper 400 by connecting the rotary link 500 to the stopper 400.

The first power transmission link 600 may be connected to one side of the base flap 210 constituting the air flap 200.

Each of the first power transmission link 600 and the second power transmission link 700 may be configured having at least two links connected to each other.

In other words, the first power transmission link 600 transmitting the power of the actuator 300 to the air flap 200 may be configured as an assembly of a first link 610 and a second link 620.

Figure 5:
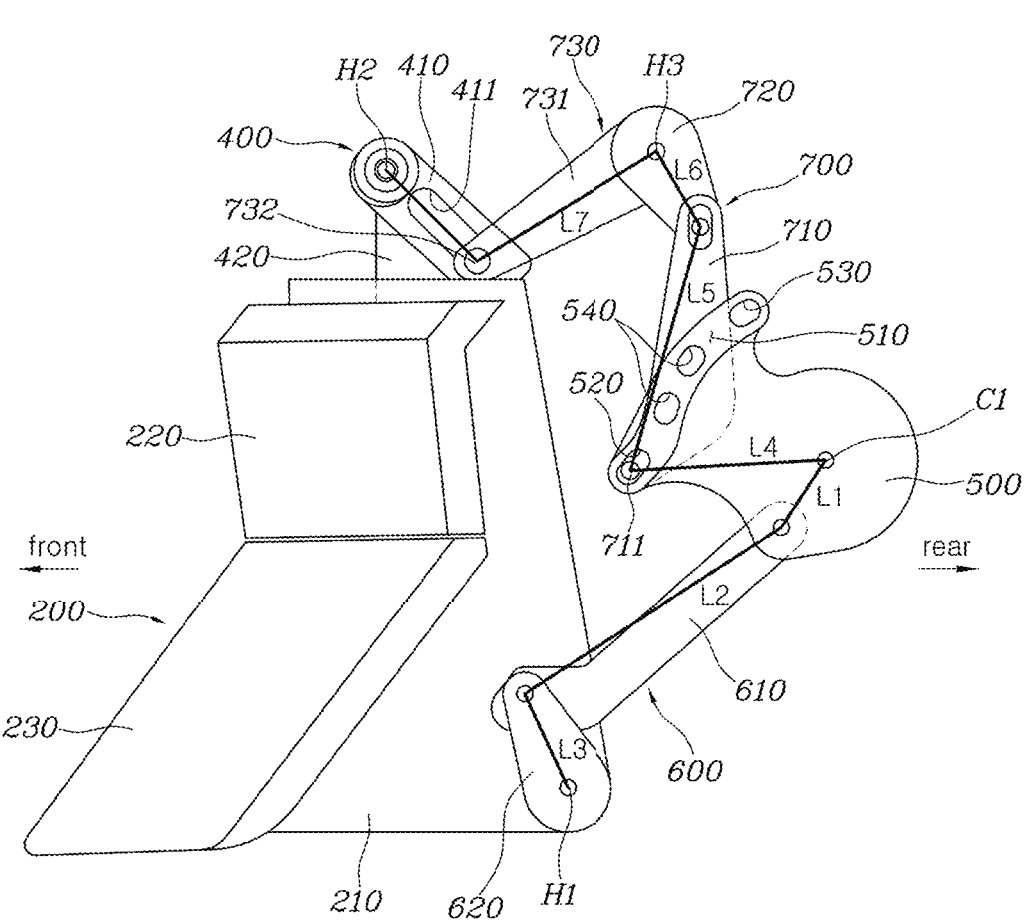
FIG. 5 is a view in which an actuator is removed in FIG. 4.

Based on a state of the active air flap apparatus as illustrated in FIG. 5, a first end of the first link 610 is coupled to the rotary link 500 at a lower position, with respect to a center point C1, and connected to the rotary link 500. A second end of the first link 610 is extended downward and is connected to a first end of the second link 620. A second end of the second link 620 is extended downward and connected to one side of the base flap 210.

When a rotational force of the rotary link 500 is transmitted to the air flap 200 through the first power transmission link 600, the air flap 200 may rotate clockwise with respect to the duct housing 100 around a hinge point H1 located at a lower rear side.

The second power transmission link 700 transmitting the power of the actuator 300 to the stopper 400 may be configured as an assembly of a third link 710, a fourth link 720, and a fifth link 750.

Based on a state of the active air flap apparatus as illustrated in FIG. 5, a first end of the third link 710 is coupled and connected to the rotary link 500 at an upper left position, with respect to a coupling point of the rotary link 500 and the first link 610. A second end of the third link 710 extends upward and is connected to a first end of the fourth link 720. A second end of the fourth link 720 extends forward and upward and is connected the fifth link 730. A connection portion 731 provided in the fifth link 730 is inserted into the slot hole 411 of the stopper 400 and is connected to the stopper 400.

The active air flap apparatus may include two connection portions 731 spaced apart to the left and right. As each of the two connection portions 731 are inserted into the slot holes 411 at both ends of the stopper 400, the fifth link 730 is connected to the stopper 400.

When the rotational force of the rotary link 500 is transmitted to the stopper 400 through the second power transmission link 700, the stopper 400 may rotate counter-clockwise with respect to the duct housing 100 around a hinge point H2 of the upper end of the body portion 410.

Referring to FIG. 5, a first total length of the links L1+L2+L3 connecting the connection points of the links 610 and 620 aligned in a straight line from the center point C1 of the rotary link 500 to an end of the first power transmission link 600 is shorter than a second total length of the links L4+L5+L6+L7 connecting the connection points of the links 710, 720 and 730 aligned in a straight line from the center point C1 of the rotary link 500 to an end of the second power transmission link 700.

The reason for the difference between the first total length of the links L1+L2+L3 and the second total length L4+L5+L6+L7 of the links is to prevent interference by the stopper 400 (e.g., with opening/closing of the air flap 200) by creating a difference between operating speeds of the air flap 200 and the stopper 400 during rotation of the rotary link 500 and when the air flap 200 operates to be opened from the closed state. In particular, a tuning or setting of the difference in operating speed between the air flap 200 and the stopper 400 is possible by adjusting a length ratio of the first total length L1+L2+L3 and the second total length L4+L5+L6+L7.

According to an embodiment of the present disclosure, when the air flap 200 operates to be opened from the closed state, by adjusting a length ratio of the first total length L1+L2+L3 and the second total length L4+L5+L6+L7, the stopper 400 operates first and the air flap 200 operates sequentially after the operation of the stopper 400 starts. Interference by the stopper 400 may thereby be prevented during the opening operation of the air flap 200.

In addition, according to an embodiment of the present disclosure, when the air flap 200 is operating to be opened from the closed state, the stopper 400 rotates counterclockwise around the hinge H2 and operates before the air flap 200. After the stopper 400 starts to operate, the air flap 200 rotates clockwise around the hinge point H1 and operates. Accordingly, interference by the stopper 400 during the opening operation of the air flap 200 is prevented.

The reason that the stopper 400 operates first is to sufficiently secure or clear the operation space for the air flap 200 operating after the stopper 400. According to the present disclosure, when the stopper 400 operates first and secures or clears the operating space for the air flap 200, the opening operation of the air flap 200 proceeds sequentially. In addition, to prevent unnecessary rotation of the stopper and to prevent unnecessary power loss or consumption, the stopper 400 ends the rotation operation when operating space for the air flap is secured or cleared.

Hereinafter, operation of the stopper 400 before the air flap 200 when the air flap 200 operates to open from the closed state is described in more detail.

The first end of the third link 710 constituting the second power transmission link 700 has the link protrusion 711 for connection with the rotary link 500. The link protrusion 711 is inserted into a guide groove 510 in the rotary link 500. The link protrusion 711 moves along the guide groove 510 during the rotation of the rotary link 500.

Figure 6:
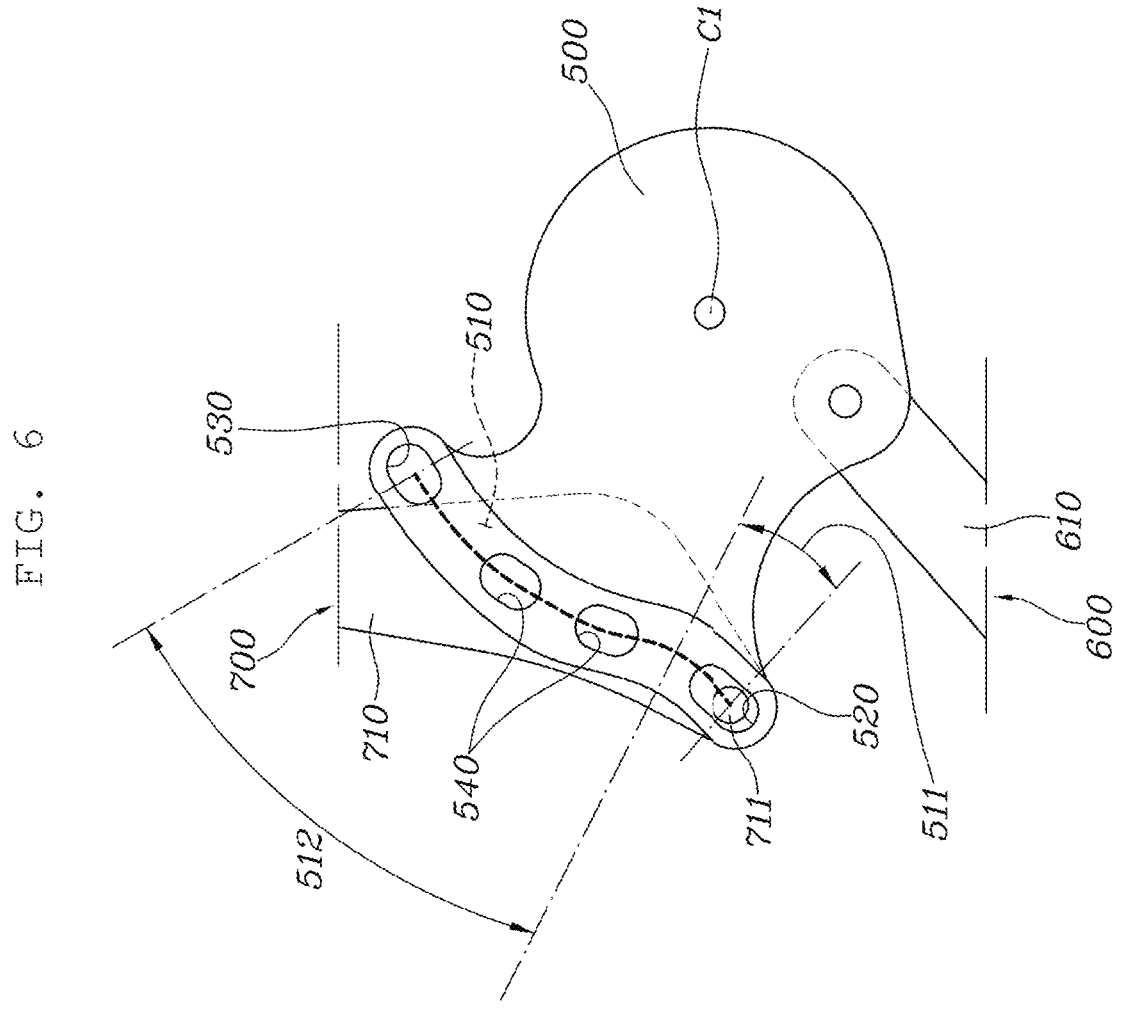
FIG. 6 is an enlarged view of a portion where a rotary link and a third link are connected to each other in FIG. 5.

Referring to FIG. 6, the guide groove 510 is divided into a stopper operation section 511 and a stopper non-operation section 512. When the link protrusion 711 moves along the stopper operation section 511, the stopper 400 operates. When the link protrusion 711 moves along the stopper non-operation section 512, the stopper is maintained in the operation end state The stopper operation section 511 is formed along a straight-line or curved-line profile diverging from a rotation radius of the rotary link 500 at a first end of the guide groove 510. The stopper non-operation section 512 is connected to the stopper operation section 511 and is formed in a curved-line profile along the rotation radius of the rotary link 500 by being extended to a second end of the guide groove 510

In addition, when the air flap 200 operates to open from the closed state, the stopper 400 and the air flap 200 operate sequentially. Considering that the operating stroke of the air flap 200 is greater than the operating stroke of the stopper 400, the length of the non-operation section 512 may be configured to be longer than the length of the stopper operation section 511.

According to an embodiment of the present disclosure, when the stopper 400 is in contact with the air flap 200 in the closed state of the air flap 200, the link protrusion 711 of the third link 710 is at the end of the stopper operation 511 (referring to FIGS. 2-6).

Figure 8:
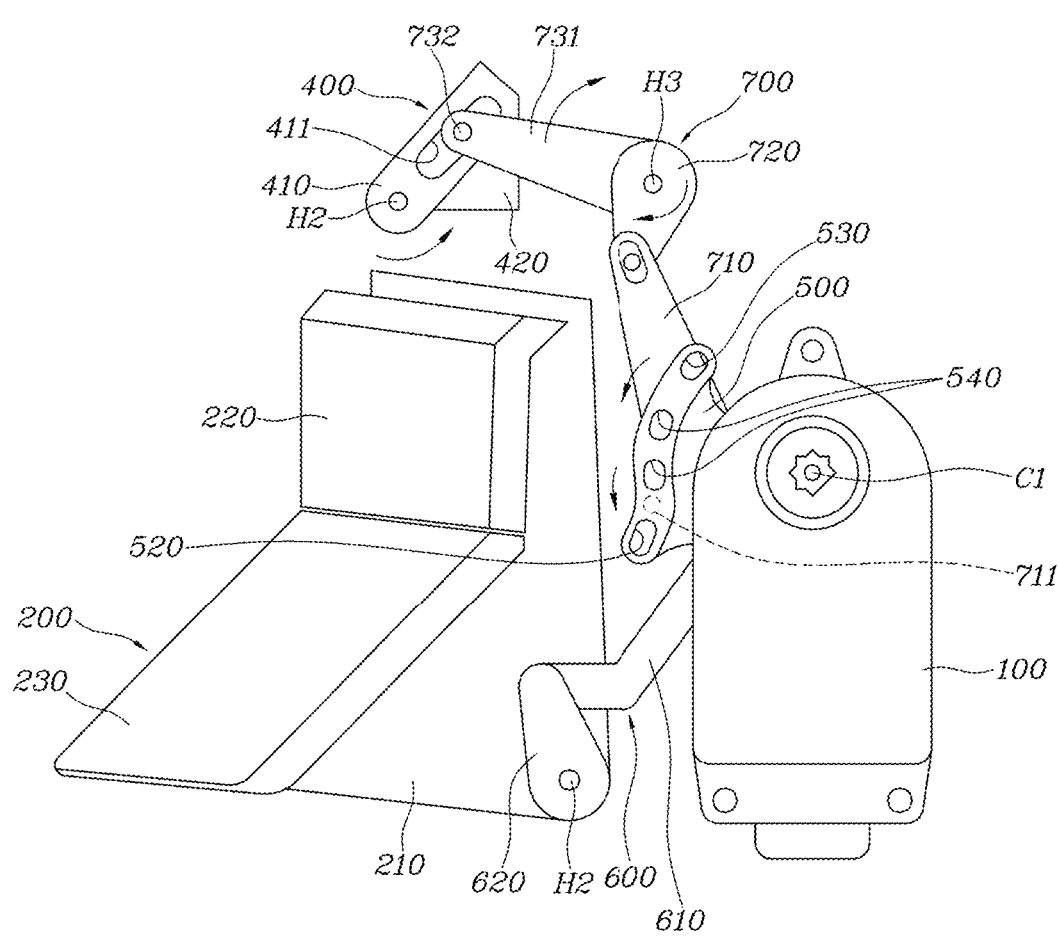
FIG. 8 is a view of a state in which the stopper is operated by an operation of a second power transmission link in FIG. 4.

When the link protrusion 711 moves along the stopper operation section 511 to an interface position between the stopper operation section 511 and the stopper non-operation section 512 due to the rotation of the rotary link 500, the stopper 400 rotates and contact of the stopper with the air flap 200 is released (referring to FIG. 8).

When the link protrusion 711 diverges from the stopper operation section 511, the operation of the stopper 400 is ended. When the link protrusion 711 moves along the stopper non-operation section 512, the stopper 400 maintains the operation end state (e.g., the stopper 400 remains in the same position).

According to an embodiment of the present disclosure, when the link protrusion 711 of the third link 710 moves along the stopper operation section 511 due to the rotation of the rotary link 500, only the stopper 400 operates, and the air flap 200 does not operate and remains in the closed state. Additionally, when the link protrusion 711 moves along the stopper non-operation section 512, the stopper 400 maintains the operation end state and the air flap 200 operates to be opened.

According to an embodiment of the present disclosure, the closing hole 20 is provided at an end of the stopper operation section 511. When the air flap 200 is closed, the link protrusion 711 is inserted into the closing hole 20. At the end of the stopper non-operation section 512, a full-open hole 520 is provided. When the air flap 200 is fully opened, the link protrusion 711 is inserted into the full-open hole 520.

The link protrusion 711 of the third link 710 is inserted into full-open hole 520 by the rotation of the rotary link 500 when the air flap 200 is in a full-open state as illustrated in FIG. 10.

A plurality of middle-open holes 540 are provided at the stopper non-operation section 512 to be spaced apart from each other. When the air flap 200 is opened to a specific angle, the link protrusion 711 is inserted into one of the middle-open holes 540.

According to an embodiment of the present disclosure, two middle-open holes 540 are provided. The air flap 200 maintains a 25% open state when the link protrusion 711 is inserted into the middle-open hole 540 closest to the close hole 520. The air flap 200 maintains 50% open state when the link protrusion 711 is inserted into the other middle-open hole 540 closest to the full-open hole 530.

If necessary, it may be possible to set various open angles of the air flap 200 by increasing a number of middle-open holes 540 to three or more.

According to an embodiment of the present disclosure, the air flap 200 is configured to open at a specific angle as the link protrusion 711 of the third link 710 is inserted into a middle-open hole 540. Due to the link protrusion 711 and middle-open hole 540, it is possible to secure the position of the air flap 200 opened to a specific angle. Thus, it is possible to prevent undesired movement and vibration of the air flap 200 opened at the specific angle, thereby improving fuel efficiency of a vehicle and energy efficiency of an electric vehicle.

Figure 7:
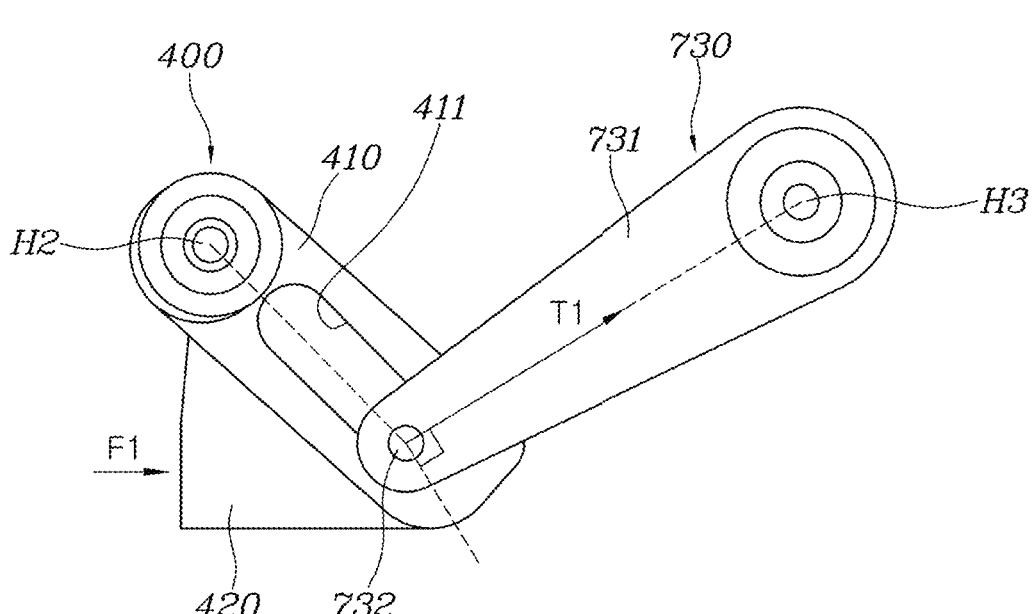
FIG. 7 is an enlarged view of a portion where a stopper and a fifth link are connected to each other in FIG. 5.

On the other hand, when the stopper 400 is in contact with the air flap 200 in the closed state of the air flap 200, referring to FIG. 7, a link pin 732 of the fifth link 730 constituting the second power transmission link 700 is located at a lowermost end of the hole 411 provided in the stopper 400.

When an external force (F1, including a driving wind) is applied to the stopper 400 in a state where the link pin 732 is located at the lowermost end of the slot hole 411, the link pin 732 has a torque in a normal direction T1. The torque T1 acts with a normal force to a hinge point H3 of the fifth link 730, so that no influence of the external force F1 is affected on movements of the fifth link 730. Thus, the fifth link 730 acts as a rigid body supporting the stopper 400 and preventing the undesired movement and vibration of the air flap 200.

Figure 9:
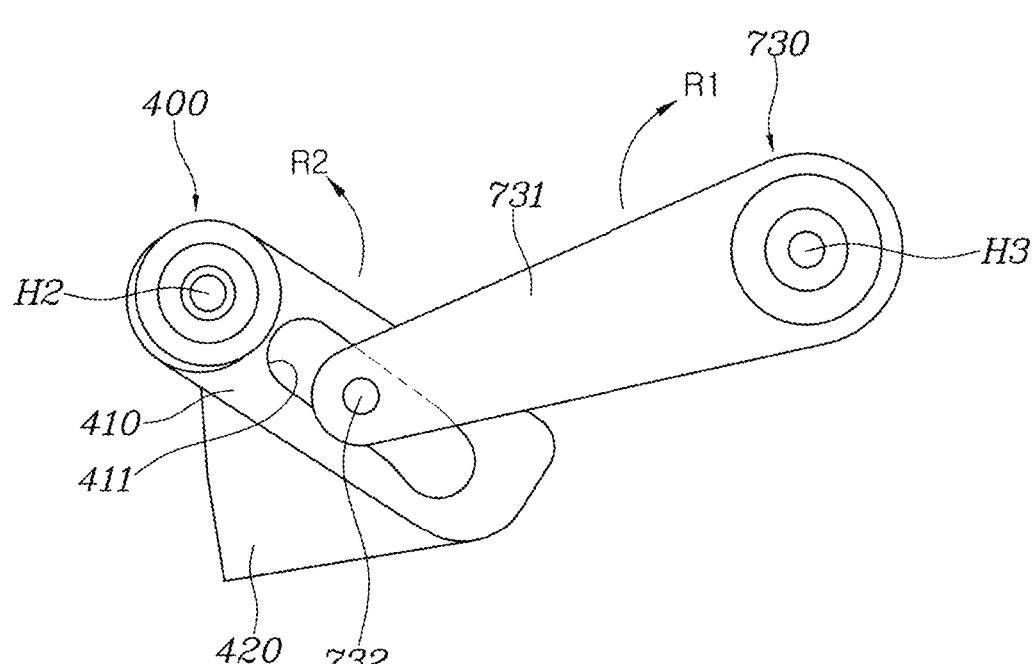
FIG. 9 is an enlarged view of a portion where the stopper and the fifth link are connected to each other in FIG. 8.

When the second power transmission link 700 operates by the rotation of the rotary link 500 in the state of FIG. 7 and the fifth link 730 rotates (arrow R1) clockwise around the hinge point H3, the link pin 732 of the fifth link 730 moves along the slot hole 411 of the stopper 400 and comes into contact with the slot hole 411 to generate torque (See FIG. 9 for arrows R1, R2). At this time, the stopper 400 rotates (arrow R2) counterclockwise around the hinge point H2, and from this moment an opening operation of the stopper 400 starts.

Reference numeral 800 shown in FIG. 1 is a sealing member in contact with the stopper 400.

As described above, according to an embodiment of the present disclosure, when the air flap 200 is in a state that closes the flow path of the duct housing 100, the first end of the air flap 200 is configured to be supported by the connection with the actuator 300, and the second end of the air flap 200 is configured to be supported by the contact with the stopper 400. Through reinforcement of the supporting force applied or available to the air flap 200, it may be possible to secure the strength or robustness of the air flap 200. Through this, even when the external force and the driving wind are applied while the air flap 200 is closed, undesired movement and vibration of the air flap 200 may be prevented. Thus, it may be possible to prevent noise and to improve aerodynamic performance.

In addition, in an embodiment of the present disclosure, when the air flap 200 is operated to be opened from the closed state, the stopper 400 operates first to secure or clear the operation space for the air flap 200 and after the stopper 400 starts to operate, the air flap 200 operates sequentially. Since the operation of the stopper 400 and the air flap 200 are configured to operate in opposite directions to each other, interference by the stopper 400 during the opening operation of the air flap 200 is prevented, thereby ensuring reliable or consistent operability.

In addition, according to an embodiment of the present disclosure, when the air flap 200 is opened to a specific angle, the position of the air flap 200 is secured with the protrusion of the link and through the hole in which the protrusion of the link is inserted.

Although embodiments of the present disclosure have been described for illustrative purposes, those of ordinary skill in the art should appreciate that various modifications, additions, and substitutions are possible, without departing from the scope and spirit of the present disclosure as defined in the accompanying claims.

What is claimed is:

1. An active air flap apparatus of a vehicle, the active air flap apparatus comprising:
   an air flap rotatably coupled to a duct housing and configured to open and close the duct housing;
   an actuator secured to the duct housing and configured to generate power for rotating the air flap during an operation thereof;
   a stopper rotatably coupled to the duct housing and configured to come into contact with the air flap when the air flap is in a closed state, thereby supporting the air flap;
   a rotary link coupled to the actuator and configured to rotate when the actuator is operated;
   a first power transmission link connecting the rotary link to a first end of the air flap and transmitting the power for rotating the air flap; and
   a second power transmission link connecting the rotary link to the stopper and transmitting power for an operation of the stopper.

2. The active air flap apparatus of claim 1, wherein in a closed state of the air flap, a first end of the air flap is supported by a connection with the actuator and a second end of the air flap is supported by contact with the stopper.

3. The active air flap apparatus of claim 1, wherein in an open state of the air flap, the stopper is separated from the air flap, and the air flap is not supported by the stopper.

4. The active air flap apparatus of claim 1, wherein the air flap comprises:
   a base flap rotatably installed in the duct housing and connected to the first power transmission link; and
   an upper flap and a lower flap coupled to a front of the base flap and vertically separated from each other.

5. The active air flap apparatus of claim 1, wherein the stopper comprises:
   a body portion having an upper end rotatably coupled to the duct housing and having a slot hole extending downward; and
   a contact portion protruding from the body portion and configured to come into contact with and support the air flap when the air flap is closed.

6. The active air flap apparatus of claim 5,
   wherein, when the air flap is closed and is in contact with the stopper, a link pin of a fifth link constituting the second power transmission link is located at a lowermost end of a slot hole formed in the stopper, and
   wherein, when an external force is applied to the stopper where the link pin is located at the lowermost end of the slot hole, a torque acts in a normal direction of the link pin, and the torque acts with a normal force to a hinge point of the fifth link so that no influence of the external force is affected on movements of the fifth link and the fifth link acts as a rigid body supporting the stopper.

7. The active air flap apparatus of claim 1,
   wherein each of the first power transmission link and the second power transmission link comprises at least two links connected to each other; and
   wherein a first total length of the links that is formed by aligning connection points of the links in a straight line from a center point of the rotary link to an end of the first power transmission link is shorter than a second total length of the links that is formed by aligning connection points of the links in a straight line from the center of the rotary link to an end of the second power transmission link.

8. The active air flap apparatus of claim 7, wherein, a length ratio of the first total length and the second total length may be adjusted to create a difference between operating speeds of the air flap and the stopper so that interference with the air flap by the stopper when the air flap is operating to be opened from the closed state is prevented.

9. The active air flap apparatus of claim 8, wherein, when the air flap is operating to be opened from the closed state, the stopper and the air flap are sequentially operated so that interference with the air flap by the stopper is prevented.

10. The active air flap apparatus of claim 9, wherein, when the stopper operates first to secure an opening operation space for the air flap, an opening operation of the air flap is sequentially performed after the stopper operates.

11. The active air flap apparatus of claim 8, wherein, when the air flap is operating to be opened from the closed state, the stopper rotates counterclockwise to operate before the air flap, and thereafter the air flap rotates clockwise and operates so that interference with the air flap by the stopper is prevented.

12. The active air flap apparatus of claim 1,
   wherein a link protrusion of a third link constituting the second power transmission link is connected to a guide groove of the rotary link and is configured to move along the guide groove during a rotation of the rotary link,
   wherein the guide groove is divided into a stopper operation section and a stopper non-operation section, and
   wherein the stopper is operated when the link protrusion moves in the stopper operation section, and the stopper is maintained in an operation end state when the link protrusion moves in the stopper non-operation section.

13. The active air flap apparatus of claim 12, wherein
   the stopper operation section is formed along a straight-line or curved-line profile diverging from a rotation radius of the rotary link at a first end of the guide groove,
   the stopper non-operation section is connected to the stopper operation section and is formed in a curved-line profile along the rotation radius of the rotary link by being extended to a second end of the guide groove, and a length of the stopper non-operation section is configured to be longer than a length of the stopper operation section.

14. The active air flap apparatus of claim 13, wherein, when the air flap is in the closed state and the stopper is in contact with the air flap, the link protrusion is located at an end of the stopper operation section, wherein, when the link protrusion moves along the stopper operation section to an interface position between the stopper operation section and the stopper non-operation section due to the rotation of the rotary link, the stopper rotates and a contact of the stopper with the air flap is released, wherein, when the link protrusion diverges from the stopper operation section, a stopper operation is ended, and wherein, when the link protrusion moves along the stopper non-operating section, the stopper is maintained in the operation end state.

15. The active air flap apparatus of claim 13, wherein, when the link protrusion moves along the stopper operation section, only the stopper operates, and the air flap does not operate and remains in the closed state.

16. The active air flap apparatus of claim 13, wherein, when the link protrusion moves along the stopper non-operation section, the stopper is maintained in the operation end state and the air flap operates to be opened.

17. The active air flap apparatus of claim 12, wherein a closing hole is provided at an end of the stopper operation section, the closing hole being configured such that when the air flap is closed, the link protrusion is inserted into the closing hole, wherein a full-open hole is provided at an end of the stopper non-operation section, the full-open hole being configured such that when the air flap is fully opened, the link protrusion is inserted into the full-open hole, and wherein a plurality of middle-open holes is provided at the stopper non-operation section to be spaced apart from each other, the middle-open holes being configured such that when the air flap is opened to a specific angle, the link protrusion is inserted into one of the middle-open holes.

18. The active air flap apparatus of claim 12, wherein a link connected to the air flap is connected to a fixed point of the rotary link, and wherein a link connected to the stopper is connected to a trajectory of the rotary link divided into the stopper operation section and the stopper non-operation section.

* * * * *